US010733076B2

(12) United States Patent
Tsai et al.

(10) Patent No.: US 10,733,076 B2
(45) Date of Patent: Aug. 4, 2020

(54) TECHNIQUES FOR DETECTING FAULTS IN RENDERING GRAPHICS

(71) Applicant: Microsoft Technology Licensing, LLC, Redmond, WA (US)

(72) Inventors: Adrian Tsai, Kirkland, WA (US); Shawn Lee Hargreaves, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 140 days.

(21) Appl. No.: 15/965,398

(22) Filed: Apr. 27, 2018

(65) Prior Publication Data
US 2019/0272206 A1 Sep. 5, 2019

Related U.S. Application Data

(60) Provisional application No. 62/637,847, filed on Mar. 2, 2018.

(51) Int. Cl.
*G06F 11/00* (2006.01)
*G06F 11/36* (2006.01)
*G06F 11/07* (2006.01)

(52) U.S. Cl.
CPC .......... *G06F 11/362* (2013.01); *G06F 11/006* (2013.01); *G06F 11/0706* (2013.01); *G06F 11/079* (2013.01); *G06F 11/0766* (2013.01); *G06F 11/3664* (2013.01); *G06F 11/0757* (2013.01); *G06F 2201/81* (2013.01)

(58) Field of Classification Search
CPC .. G06F 11/362; G06F 11/3636; G06F 11/366; G06F 11/3664
See application file for complete search history.

(56) References Cited

U.S. PATENT DOCUMENTS

| | | | |
|---|---|---|---|
| 2009/0158257 A1* | 6/2009 | Xu ........................ | G06F 11/362 717/129 |
| 2012/0284698 A1* | 11/2012 | Brunkhorst ........... | G06F 11/362 717/128 |
| 2013/0091493 A1* | 4/2013 | Sowerby ............. | G06F 11/3624 717/125 |
| 2014/0146062 A1* | 5/2014 | Kiel .................... | G06F 11/3664 345/522 |

(Continued)

OTHER PUBLICATIONS

Brodtkorb et al., "Graphics processing unit (GPU) programming strategies and trends in GPU computing", 2013, Journal of Parallel and Distributed Computing, 73, pp. 4-13 (Year: 2013).*

*Primary Examiner* — Michael Maskulinski
(74) *Attorney, Agent, or Firm* — Arent Fox LLP

(57) ABSTRACT

Examples described herein generally relate to reporting faults in a graphics processing unit (GPU). A list of rendering instructions for causing the GPU to render graphics can be captured, and occurrence of a fault in executing the list of rendering instructions can be detected. A portion of the list of rendering instructions can be executed, in isolation from a second portion of the list of rendering instructions, based on detecting occurrence of the fault to identify the fault in the portion of the list of rendering instructions or the second portion of the list of rendering instructions. The portion of the list of rendering instructions or the second portion of the list of rendering instructions can be indicated as causing the fault.

20 Claims, 4 Drawing Sheets

(56) References Cited

U.S. PATENT DOCUMENTS

2014/0372990 A1* 12/2014 Strauss ................. G06F 11/362
                                                                717/133
2017/0039124 A1*  2/2017 Kiel ........................ G06F 9/526
2019/0180407 A1*  6/2019 Goossen ................... G06T 1/20

* cited by examiner

TECHNIQUES FOR DETECTING FAULTS IN RENDERING GRAPHICS

CLAIM OF PRIORITY UNDER 35 U.S.C. § 119

The present application for patent claims priority to Provisional Application No. 62/637,847, entitled "TECHNIQUES FOR DETECTING FAULTS IN RENDERING GRAPHICS" filed Mar. 2, 2018, which is assigned to the assignee hereof and hereby expressly incorporated by reference herein for all purposes.

BACKGROUND

Use of computing devices is becoming more ubiquitous by the day. Computing devices range from standard desktop computers to wearable computing technology and beyond. One area of computing devices that has grown in recent years is in the context of image rendering, such as rendering of games, video streams, etc., which typically rely on a graphics processing unit (GPU) to render graphics from a computing device to a display device based on rendering instructions received from the computing device. Typically, an application provides rendering instructions to the GPU via a graphics driver, and a list of GPU commands can be generated, based on the rendering instructions, for execution on the GPU. The timing of executing the GPU commands is not intuitive based on the timing of providing the rendering instructions, and indeed the GPU commands may be generated and/or executed at some time after the rendering instructions are received due to deferred execution of the GPU.

Detecting faults in the GPU, such as timeout detection and recovery (TDR) or other faults, may not be possible based on deferred execution of the GPU commands. For example, occurrence of the GPU fault may cause the GPU to cease executing, reset, etc., and state information may be lost at that time. In addition, deferred execution of the GPU commands may complicate fault detection as faults occurring may not be easily traceable to a previously issued rendering instruction.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a method for reporting faults in a graphics processing unit (GPU) is provided. The method includes capturing a list of rendering instructions for causing the GPU to render graphics, detecting occurrence of a fault in executing the list of rendering instructions, executing, based on detecting occurrence of the fault, a portion of the list of rendering instructions, in isolation from a second portion of the list of rendering instructions, to identify the fault in the portion of the list of rendering instructions or the second portion of the list of rendering instructions, and indicating the portion of the list of rendering instructions or the second portion of the list of rendering instructions as causing the fault.

In another example, a computing device for reporting faults in a GPU is provided that includes a memory storing one or more parameters or instructions for executing an operating system and one or more applications including a fault detecting application, and at least one processor coupled to the memory. The at least one processor is configured to capture a list of rendering instructions for causing the GPU to render graphics, detect occurrence of a fault in executing the list of rendering instructions, execute, based on detecting occurrence of the fault, a portion of the list of rendering instructions, in isolation from a second portion of the list of rendering instructions, to identify the fault in the portion of the list of rendering instructions or the second portion of the list of rendering instructions, and indicate the portion of the list of rendering instructions or the second portion of the list of rendering instructions as causing the fault.

In another example, a computer-readable medium, including code executable by one or more processors for reporting faults in a GPU is provided. The code includes code for capturing a list of rendering instructions for causing the GPU to render graphics, detecting occurrence of a fault in executing the list of rendering instructions, executing, based on detecting occurrence of the fault, a portion of the list of rendering instructions, in isolation from a second portion of the list of rendering instructions, to identify the fault in the portion of the list of rendering instructions or the second portion of the list of rendering instructions, and indicating the portion of the list of rendering instructions or the second portion of the list of rendering instructions as causing the fault.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

Figure 1:
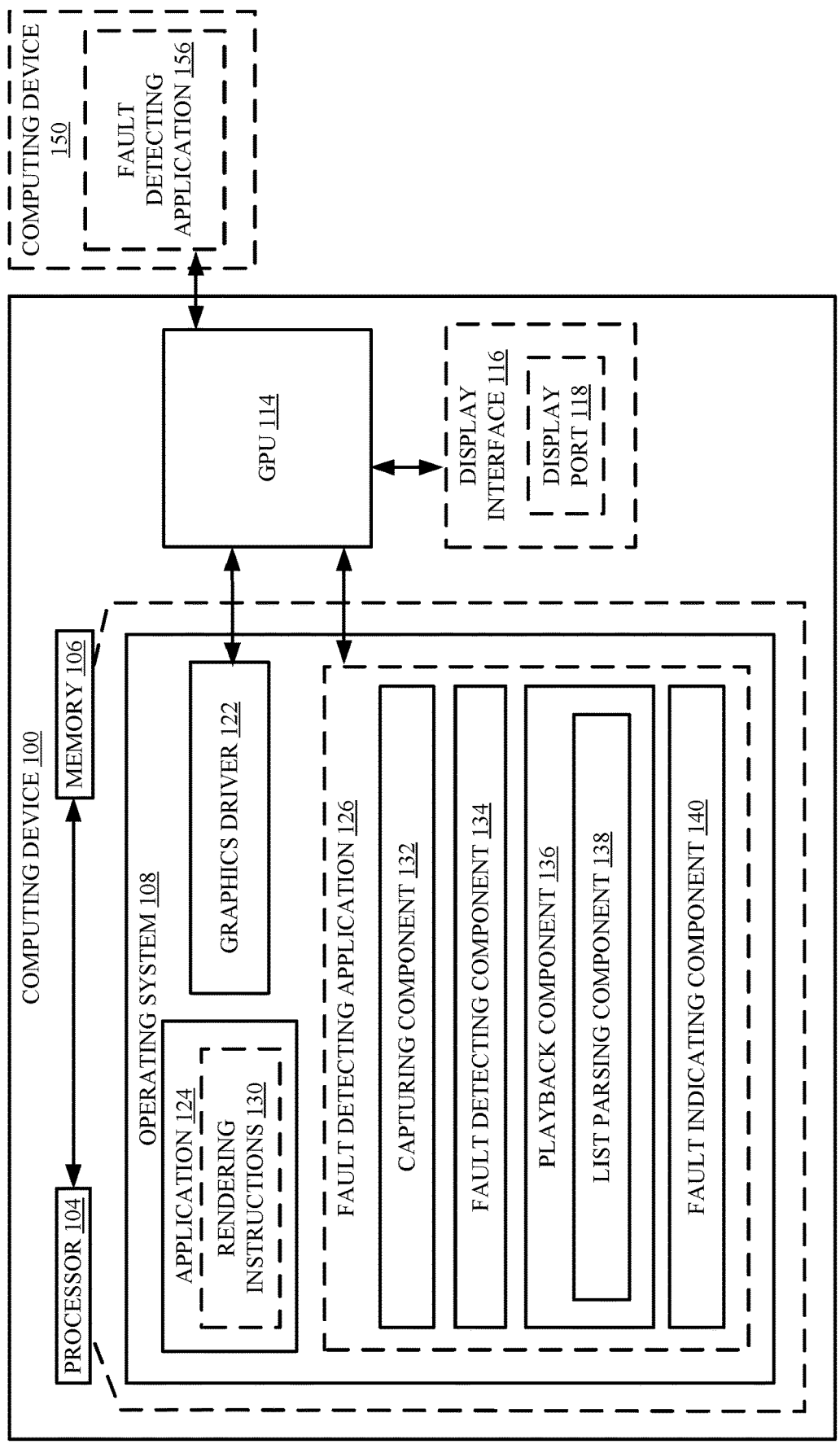
FIG. 1 is a schematic diagram of an example of a computing device for detecting and tracking faults occurring in a graphics processing unit (GPU) in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to detecting faults in rendering graphics. A graphics processing unit (GPU) can execute commands to render images based on rendering instructions received from an application. The GPU, which may operate according to a deferred execution, may execute GPU commands based on the rendering instructions (e.g., to dispatch rays in ray tracing, perform drawing operations in rasterization, etc.) to render an image. During execution of the GPU commands, however, the GPU may encounter a fault or error, such as a timeout detection and recovery (TDR) or other fault, which may be due to various causes, including but not limited to malformed GPU commands. As tracking the source of the fault may typically be a difficult task, rendering instructions sent to the GPU and/or corresponding GPU commands can be logged by a fault detection application, such that when a fault occurs, the fault detection application can detect occurrence of the fault and/or re-execute rendering instructions in an attempt to determine which instruction(s) (and/or related GPU command(s)) are causing the fault.

For example, the fault detection application can execute a capture operation for capturing rendering instructions sent by an application and/or corresponding GPU commands executed by the GPU in rendering a corresponding image. Where a fault occurs on the GPU, the fault detecting application can playback (e.g., re-execute) captured rendering instructions and/or GPU commands (e.g., along with a context or state of memory resources that may be recorded as part of the capture) to determine instruction(s) and/or command(s) that cause the fault. For example, the fault detecting application can playback a portion of instructions and/or commands that were executed within a threshold time of the fault to determine whether one or more of the instructions and/or commands caused the fault. For example, given a list of instructions and/or corresponding commands, the fault detecting application can playback different portions of the list of instructions and/or commands in isolation to determine whether the fault occurs in the different portion of the list and accordingly narrow the instructions and/or commands determined to cause the fault. The fault detecting application can continue to narrow the list of instructions and/or commands until a single instruction and/or command (or a small list of instructions and/or commands) are determined as the cause of the fault, at which point the fault detecting application may indicate the instruction(s) and/or command(s) as the source of the fault.

Figure 2:
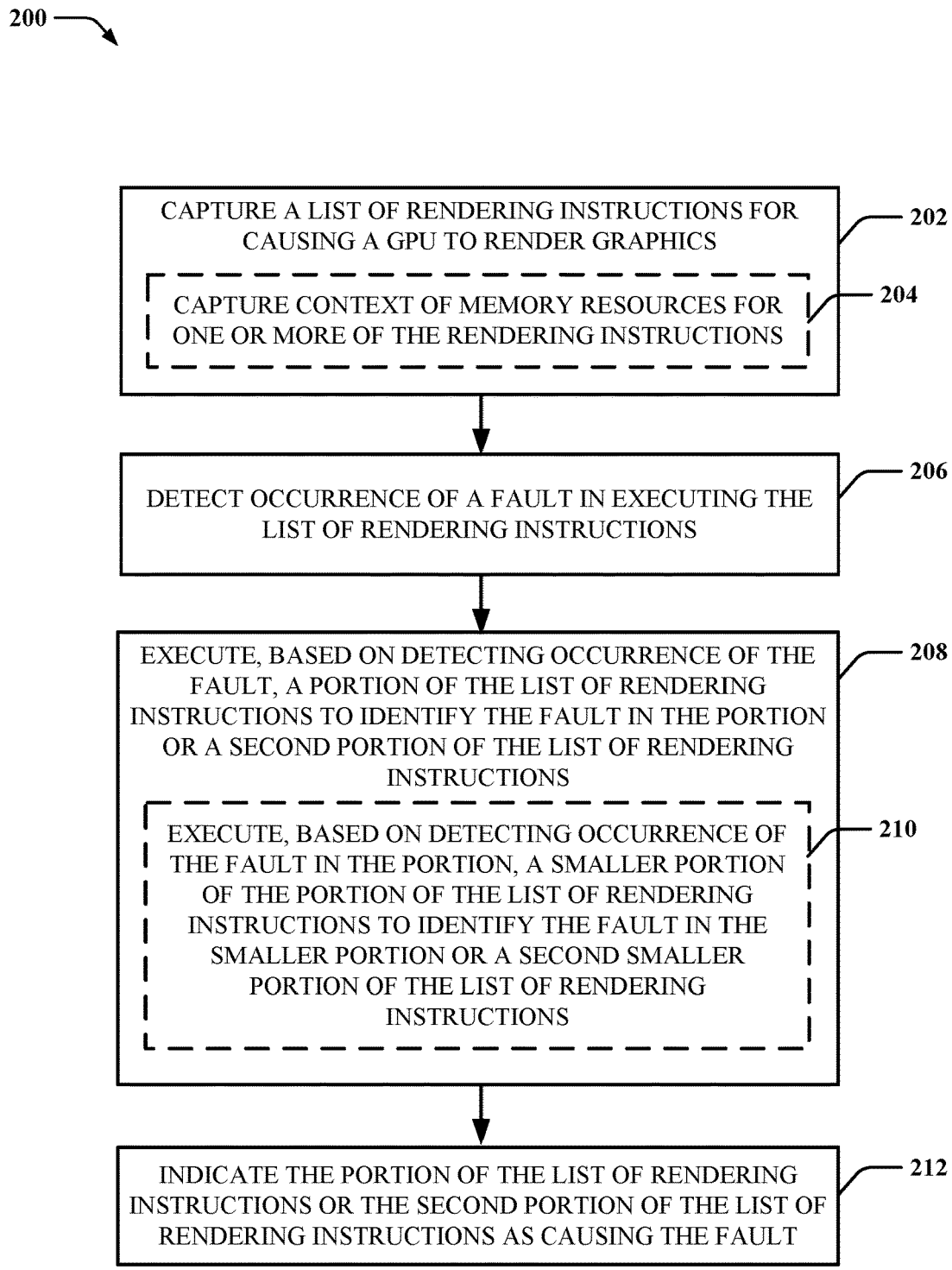
FIG. 2 is a flow diagram of an example of a method for determining one or more rendering instructions causing a fault in a GPU in accordance with examples described herein.
Figure 3:
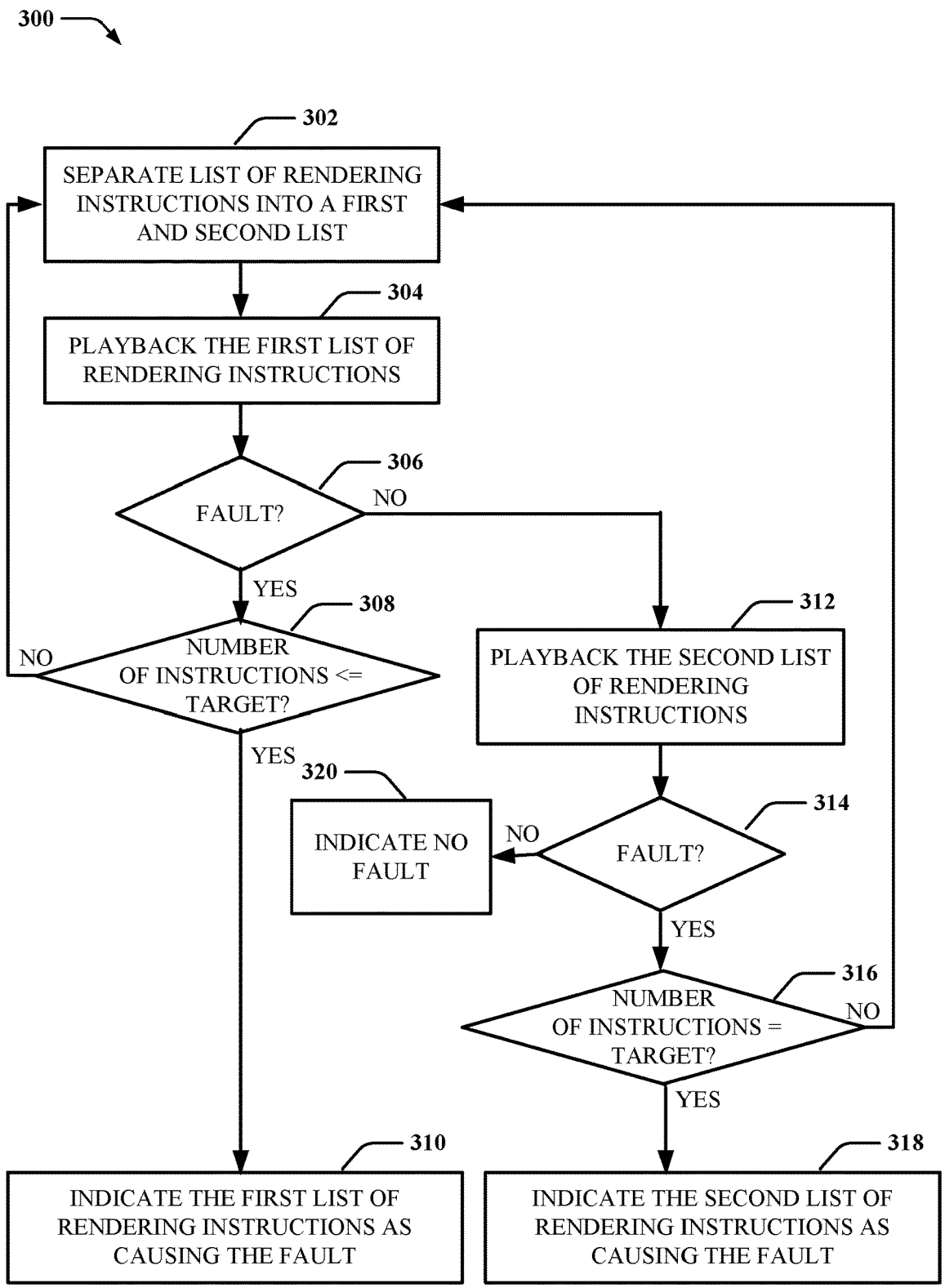
FIG. 3 is a flow diagram of an example of a method for playing back lists of rendering instructions to determine one or more rendering instructions causing a fault in a GPU in accordance with examples described herein.

Turning now to FIGS. 1-4, examples are depicted with reference to one or more components and one or more methods that may perform the actions or operations described herein, where components and/or actions/operations in dashed line may be optional. Although the operations described below in FIGS. 2 and 3 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100 and/or related components for detecting faults occurring at a GPU when rendering graphics. For example, computing device 100 can include or can otherwise be coupled with a processor 104 and/or memory 106, where the processor 104 and/or memory 106 can be configured to execute or store instructions or other parameters related to generating rendering instructions to cause a GPU to render one or more images, as described herein. Computing device 100 can execute an operating system 108 (e.g., via processor 104 and/or memory 106) for providing an environment for executing one or more applications. The computing device 100 can also include a GPU 114 for processing rendering instructions, and/or communicating associated commands to a display interface 116 to cause display of one or more images on a display, which may be coupled to the computing device 100 via a display port 118.

In an example, display interface 116 can be communicatively coupled with the processor 104 and/or memory 106 for communicating with a display (not shown) via a display port 118. Display port 118, as referred to herein, can include one or more of various types of ports, including a high definition multimedia interface (HDMI) port, a display serial interface (DSI) port, a mobile industry processor interface (MIPI) DSI port, a universal serial bus (USB) port, a Firewire port, or other embedded or external wired or wireless display ports that can allow communications between computing device 100 and the display.

In one example, GPU 114 can be part of the display interface 116 (e.g., a processor on a circuit board of the display interface 116). In another example, GPU 114, display interface 116, etc., can be integrated with processor 104. Substantially any combination of hardware can be possible such that GPU 114, display interface 116, etc., can communicate with processor 104 via a bus to facilitate providing the rendering instructions to the GPU 114. GPU 114 can process the rendering instructions to render an image, and can initiate display of at least a portion of the image on the display by transmitting associated signals to the display via display port 118 of display interface 116. In an example, GPU 114 can support ray tracing, rasterization, or other mechanism for generating an image based on received rendering instructions.

In one example, an application 124 can operate (e.g., via operating system 108) to generate images for displaying via display interface 116. Application 124 may generate rendering instructions 130 for rendering an image, where the rendering instructions 130 may define geometry for an image related to ray tracing the image, rasterizing the image, etc. In one example, application 124 can generate the rendering instructions 130 using an application programming interface (API) provided by the graphics driver 122 that allows for defining image geometry, shaders or other threads of executing to modify the geometry, etc. The graphics driver 122 can generate GPU-specific commands based on the rendering instructions to facilitate rendering of the image via GPU 114. In an example, the graphics driver 122 can generate the GPU-specific commands and provide to the GPU 114 in a separate thread of execution, and the GPU 114 can execute the commands in a different time domain than the generation and providing of the rendering instructions 130 to the graphics driver 122 (e.g., at some indeterminable time after generation/providing of the rendering instructions 130). This can be referred to as deferred execution, and may complicate fault detection and tracking at the GPU 114. For example, one of the GPU-specific commands may cause a fault at the GPU 114, such as a TDR or other fault from which the GPU 114 may not recover. It may be difficult to determine the rendering instruction that caused the fault.

In this regard, a fault detecting application 126 can be provided for detecting and tracing faults occurring on the GPU 114 such to indicate where in the rendering instructions 130 the fault occurs. This can allow a developer of the application 124 to determine and/or correct the errant rendering instruction. For example, the fault detecting application 126 can include a capturing component 132 for capturing rendering instructions 130 provided to the graphics driver 122 for causing the GPU 114 to render an image, and/or to capture the corresponding GPU-specific commands associated with the rendering instructions 130, and a fault detecting component 134 for detecting an occurrence of a fault at the GPU 114. The fault detecting application 126 may also include a playback component 136 for playing back rendering instructions 130 to determine a list of rendering instructions that are causing the detected fault, where the playback component 136 may include a list parsing component 138 for parsing the list of rendering instructions into multiple lists to narrow the rendering instructions. For example, the list parsing component 138 can keep narrowing the list of rendering instructions for playback via playback component 136 until a single rendering instruction or set of rendering instructions are determined as causing the fault. The fault detecting application 126 can also include a fault indicating component 140 for indicating (e.g., on a user interface displayed on a display device) the determined rendering instruction(s) causing the GPU fault.

In an example, fault detecting application 126 may execute on the same computing device 100 or as fault detecting application 156 operating on a different computing device 150 (where the different computing device 150 can have a separate processor, memory, operating system, etc. to execute the fault detecting application 156) so long as the fault detecting application 126, 156 can at least communicate with GPU 114, graphics driver 122, or a related component (e.g., via an API), to obtain the rendering instructions 130, associated GPU-specific commands sent to the GPU 114 for rendering images, etc. allowing the fault detecting application 126 to capture and playback the rendering instructions 130 or GPU-specific commands on the GPU 114, and detect the associated fault. The fault detecting application 126, 156 can operate to identify one or more rendering instructions or associated GPU-specific commands causing the fault, and to display one or more parameters related to the one or more rendering instructions or associated GPU-specific commands causing the fault.

FIG. 2 is a flowchart of an example of a method 200 for detecting rendering instructions that may cause a fault in a GPU. For example, method 200 can be performed by a computing device 100, and is accordingly described with reference to FIG. 1, as a non-limiting example of an environment for carrying out method 200.

In method 200, at action 202, a list of rendering instructions for causing a GPU to render graphics can be captured. In an example, capturing component 132, e.g., in conjunction with processor 104, memory 106, fault detecting application 126, 156, etc., can capture the list of rendering instructions 130 for causing the GPU 114 to render graphics. As described, an application, such as application 124, can generate the rendering instructions 130 for providing to a graphics driver 122 to cause the GPU 114 to render graphics.

In one example, graphics driver 122 can generate one or more GPU-specific commands for providing to the GPU 114 to cause the GPU to render the graphics, which may include memory accessing commands, shader execution, etc.

In one example, capturing component 132 can activate capturing of the rendering instructions and/or associated GPU commands to detect the GPU fault. For example, capturing component 132 can activate the capturing based on receiving an input via a user interface to activate capturing, perform fault detection, etc. In any case, once activated, capturing component 132 can receive the rendering instructions 130 from the graphics driver 122, which can be based on a callback function registered with the graphics driver 122 to provide the rendering instructions 130 when received from the application 124, to provide the corresponding GPU-specific commands when generated, etc. In another example, capturing component 132 may similarly register a callback function with the GPU 114 to obtain the GPU-specific commands or corresponding rendering instructions. Alternatively, for example, capturing component 132 may intercept the rendering instructions by injecting itself in between the issuing application (e.g., application 124) and the graphics runtime that implements the rendering API (e.g., graphics driver 122). This injection may be accomplished using a detouring mechanism or other processor debugging technology. In other examples, capturing component 132 can periodically request a list of rendering instructions, GPU-specific commands, etc. from the graphics driver 122, GPU 114, etc. In any case, capturing component 132 captures the rendering instructions 130 or related GPU-specific commands provided to the GPU 114 for rendering graphics during a period of time. In addition, for example, the rendering instruction 130 can include ray dispatching instructions for ray tracing, draw commands for rasterizing objects in the image, etc., and may be at least partially defined by the graphics driver 122.

In any case, capturing component 132 may store the captured rendering instructions 130 in a capture file or other representation in memory. In this regard, the captured rendering instruction 130 may be capable of being obtained (e.g., from the capture file or other representation) and progressively re-executed, as described further herein, in isolation of other rendering instructions or commands in an attempt to detect the fault-causing instruction(s). The capture file may include various information about the rendering instructions as well, and essentially can include information needed to playback the rendering instructions. This may include, for example, context information, such as a state, one or more dependencies, etc., that may be captured by capturing a state of memory resources or after executing one or more of the rendering instruction(s), as described herein.

In method 200 as part of capturing the list of rendering instructions at action 202, optionally at action 204, a context of memory resources for one or more of the rendering instructions can be captured. In an example, capturing component 132, e.g., in conjunction with processor 104, memory 106, fault detecting application 126, 156, etc., can capture the context of memory resources for one or more of the rendering instructions. When executing rendering instructions 130, the GPU 114 can typically erase any state/context information once the rendering instructions 130 are executed. In this regard, fault detecting application 126 can perform state tracking to track state information of memory 106 or other resources, such as geometry being used in a draw instruction, a render target to be written to by the rendering instructions 130, etc. In this example, capturing component 132 can capture at least one of the context or a state of the memory resources corresponding to one or more of the rendering instruction or one or more groups or lists of the rendering instructions 130, one or more dependencies between rendering instructions, etc. This can allow for restoring the context and/or state information as it was before executing one or more of the rendering instructions 130, one or more groups of associated rendering instructions, and/or the like.

For example, capturing component 132 can capture a state for each rendering instruction and/or at least for rendering instructions that cause modification of the context (e.g., modification of memory 106, etc.), such as draw instructions. In one example, capturing component 132 can capture at least a partial state of the memory (e.g., changes from a previously captured state of the memory) allocated for GPU operations for the rendering instruction(s) before execution of the rendering instruction(s). For example, capturing component 132 may use a running state vector to capture at least one of an initial state of the resources before executing a certain portion of rendering instructions 130, along with modifications in each entry of the vector that correspond to one or more modifications of the resources caused by one or more of the rendering instructions 130. Thus, based on the running state vector, the state/context information can be restored to a point in time before one or more of the rendering instructions 130 are executed to facilitate executing portions of the rendering instructions 130 in isolation, as described further herein. For example, this can further facilitate executing the rendering instructions in isolation in an attempt to locate the instruction(s) causing the fault at the GPU 114, as capturing the context may mitigate the need to re-execute previous rendering instructions.

In method 200, at action 206, occurrence of a fault in executing the list of rendering instructions can be detected. In an example, fault detecting component 134, e.g., in conjunction with processor 104, memory 106, fault detecting application 126, 156, etc., can detect occurrence of the fault (e.g., at the GPU 114) in executing the list of rendering instructions. For example, fault detecting component 134 can detect occurrence of the fault based on receiving a notification of the fault from the GPU 114 or the graphics driver 122, based on detecting a failed attempt to communicate with the GPU 114, etc. In one example, where one or more GPU-specific commands, generated from the rendering instructions 130, causes the fault, the GPU 114 can throw an exception or otherwise notify the graphics driver 122 of the fault. The graphics driver 122 can provide an indication of the fault to the fault detecting component 134 (e.g., based on a callback function) and/or the fault detecting component 134 may intercept a communication between the GPU 114 and graphics driver 122 indicating occurrence of the fault. As described, the fault can correspond to a TDR or other observable fault on the GPU 114. In one example, the fault detecting application 126 may allow for specifying certain types of faults, and the fault detecting component 134 may detect and/or take further action only for the specified types of faults. In any case, based on detecting the fault, the fault detecting application 126 can begin to parse the list of rendering instructions into multiple smaller lists, and re-execute the rendering instructions to narrow down to the rendering instruction(s) causing the fault, as described further herein.

In method 200, at action 208, a portion of the list of rendering instructions can be executed, based on detecting occurrence of the fault, to identify the fault in the portion or a second portion of the list of rendering instructions. In an example, playback component 136, e.g., in conjunction with processor 104, memory 106, fault detecting application 126, 156, etc., can execute, based on detecting occurrence of the fault, the portion of the list of rendering instructions to identify the fault in the portion or the second portion (or other portions) of the list of rendering instructions. In this regard, for example, list parsing component 138 can begin to pare down the list of rendering instructions to narrow down the instruction(s) causing the fault. For example, list parsing component 138 may separate the list of captured rendering instructions 130 into two or more lists of rendering instructions (e.g., one list including approximately half of the list of rendering instructions 130, and another list including the remainder of the rendering instructions 130). In addition, for example, list parsing component 138 can start with a list of rendering instructions that is a threshold number of rendering instructions or a threshold time back before the fault occurred. In yet another example, list parsing component 138 can generate a list of rendering instructions for playback, and where the fault does not occur in the list, list parsing component 138 can generate a larger list of rendering instructions that includes instructions further back in time, etc. In another example, list parsing component 138 can separate the list of captured rendering instructions 130 based on command lists specified by the application 124, such that playback component 136 can execute one or more of the command lists in isolation to determine which command list includes the fault, at which point playback component 136 can parse the command list into one or more commands to further determine which command or set of commands cause the fault, as described herein. For example, the command lists specified by the application 124 can include groupings of commands (e.g., groupings of rendering instructions) corresponding to an object, a scene, etc.

In any case, playback component 136 can playback partial lists of the rendering instructions 130 in isolation from other rendering instructions to determine whether the fault occurs in one or more of the partial lists. In this example, playback component 136 can use the captured context/state information to restore a context (e.g., based determining a desired portion of a running state vector) to a point in time before executing a first command in a given partial list. In any case, where the fault is detected in a partial list of the rendering instructions, this partial list can again be pared into multiple smaller partial lists for playback (and associated context/state information can be determined and/or restored) to determine in which smaller partial list the fault occurs, and so on until a single rendering instruction (or threshold number of instructions) is determined to cause the fault. Thus, for example, in method 200 as part of executing the portion of the list of rendering instructions at 208, optionally at 210, a smaller portion of the list of rendering instructions may be executed, based on detecting occurrence of the fault in the portion, to identify the fault in the smaller portion of the list of rendering instructions. In an example, playback component 136, e.g., in conjunction with processor 104, memory 106, fault detecting application 126, 156, etc., can execute, based on detecting occurrence of the fault in the portion of the list of rendering instructions, the smaller portion of the portion of the list of rendering instructions to identify the fault in the smaller portion or the second smaller portion (or other smaller portions) of the portion of the list of rendering instructions.

In an example, list parsing component 138 can continue to pare the list of rendering instructions into smaller and smaller lists, and playback component 136 can continue to playback the rendering instructions in the smaller and smaller lists and detecting the fault in one of the multiple smaller lists by repeating this action until the rendering instruction(s) causing the fault at the GPU 114 is/are identified. In addition, as described, playback component 136 can playback each list of the rendering instructions along with the corresponding context captured for the rendering instruction(s) (e.g., for a first rendering instruction in the list) to allow for executing the lists of rendering instructions in isolation. In this example, playback component 136 can set the context by restoring a state of memory resources based on that stored for the list of rendering instructions before playback, as described.

In addition, executing (or playback) of the list rendering instructions may be accomplished based on playback component 136 executing the set of rendering instructions to the graphics driver 122 or GPU 114 to cause the GPU 114 to execute the GPU-specific commands the correspond to the rendering instructions. Thus, when the fault occurs, the rendering instruction set becomes smaller and smaller with further playback to allow for identifying the rendering instruction or a small set of rendering instructions causing the fault. In an example, the rendering instructions may include sets of instructions that are bundled into a single rendering instruction. In this example, the playback component 136 can further expand and execute each of the rendering instructions, in the set of instructions that are bundled into the single rendering instruction, in isolation as individual rendering instructions. In addition, upon expanding the set of instructions from the signal rendering instruction, list parsing component 138 may parse the set of instructions into multiple lists of rendering instructions as well to allow for further inspection of the instructions within the single bundled instruction, in isolation, in an attempt to identify the cause of the fault.

In method 200, at action 212, the portion of the list of rendering instructions or the second portion of the list of rendering instructions can be indicated as causing the fault. In an example, fault indicating component 140, e.g., in conjunction with processor 104, memory 106, fault detecting application 126, 156, etc., can indicate the portion of the list of rendering instructions or the second portion of the list of rendering instructions as causing the fault. For example, fault indicating component 140 can indicate the first portion or second portion or one or more smaller portions, as described, as the cause of the fault. In one example, fault indicating component 140 can indicate one or more identifiers of rendering instructions in the first portion or second portion of the list of rendering instructions, such as a global identifier of the rendering instruction (e.g., a sequential identifier representing the sequence of the rendering instruction in the list of captured rendering instructions, etc.).

FIG. 3 is a flowchart of an example of a method 300 for playing back rendering instructions to detect one or more rendering instructions that may cause a fault in a GPU. For example, method 300 can be performed by a computing device 100, and is accordingly described with reference to FIG. 1, as a non-limiting example of an environment for carrying out method 300.

In method 300, at action 302, a list of rendering instructions can be separated into a first and second list. In an example, list parsing component 138, e.g., in conjunction with processor 104, memory 106, fault detecting application 126, 156, etc., can separate the list of rendering instructions into the first and second list. For example, list parsing component 138 may separate the list of rendering instructions based on an indication to detect a fault in the list of rendering instructions, which may be specified by the fault detecting application 126 and/or may be based on an indication to begin fault detection specified via a user interface on the fault detecting application 126. In addition, the list of rendering instructions can include rendering instructions 130 captured from an application 124 or graphics driver 122 for rendering graphics on GPU 114. As described, for example, capturing of the rendering instructions may occur based on an indication via a user interface to capture the rendering instructions. In addition, for example, list parsing component 138 may determine to parse a list of previously-executed rendering instructions based on a fault detecting component 134 detecting a fault caused on the GPU 114, as described above. Moreover, for example, list parsing component 138 can separate the list of rendering instructions into the first and second list by separating the rendering instructions approximately in half or some other logical division of the rendering instructions to allow for playback of smaller sets of the rendering instructions in isolation.

In this regard, in method 300, at action 304, the first list of rendering instructions can be played back. In an example, playback component 136, e.g., in conjunction with processor 104, memory 106, fault detecting application 126, 156, etc., can playback the first list of rendering instructions. In this example, playback component 136 can provide the first list of rendering instructions to the graphics driver 122 and/or GPU 114 to cause the GPU to again execute the first list of rendering instructions. In addition, for example, playback component 136 can set a context related to a time with the first list of rendering instructions were previously-executed, as described, which may include setting a state of memory resources accessed by the GPU 114 to a previous state, which may also have been captured by capturing component 132, as described. In one example, playback component 136 can provide the context to the graphics driver 122 and/or GPU 114 for setting the memory resources for use in playing back the first set of rendering instructions.

In method 300, at action 306, it can be determined whether a fault occurred from playback of the first list of rendering instructions. In an example, fault detecting component 134, e.g., in conjunction with processor 104, memory 106, fault detecting application 126, 156, etc., can determine whether the fault occurred. For example, as described, fault detecting component 134 may receive a notification of the fault from the graphics driver 122 and/or GPU 114 if the fault occurred. In one example, fault detecting application 126 can wait for a period of time, based on deferred execution of the GPU 114, to determine whether the fault occurs.

If the fault did occur in the first list of rendering instructions, at action 308, it can be determined whether the number of instructions in the first list are less than or equal to (e.g., achieve) a target number. In an example, playback component 136, e.g., in conjunction with processor 104, memory 106, fault detecting application 126, 156, etc., can determine whether the number of instructions in the first list achieve a target or threshold number, which may be a low or floor target. For example, the target may be one for a single rendering instruction.

In any case, if the number of instructions in the first list achieve the target, at action 310, the first list of rendering instructions can be indicated as causing the fault. In an example, fault indicating component 140, e.g., in conjunction with processor 104, memory 106, fault detecting application 126, 156, etc., can indicate the first list of rendering instructions as causing the fault. As described, this can include displaying an indication on a user interface provided by the fault detecting application 126 to indicate the one or more rendering instructions in the first list. This can allow a developer to determine the rendering instruction(s) causing the fault, which may enable the developer to quickly identify the rendering instruction(s) and make modifications in an attempt to correct the fault.

If the number of instructions in the first list do not achieve the target, at action 308, method 300 can continue to method 302 to separate the list of rendering instructions (the first list of rendering instructions) again into a first and second list. If occurrence of the fault is not detected at action 306, at action 312, the second list of rendering instructions can be played back. In an example, playback component 136, e.g., in conjunction with processor 104, memory 106, fault detecting application 126, 156, etc., can playback the second list of rendering instructions. In this example, playback component 136 can provide the second list of rendering instructions to the graphics driver 122 and/or GPU 114 to cause the GPU to again execute the second list of rendering instructions. In addition, for example, playback component 136 can set a context related to a time with the second list of rendering instructions were previously-executed, as described, which may include setting a state of memory resources accessed by the GPU 114 to a previous state, which may also have been captured by capturing component 132, as described. In one example, playback component 136 can provide the context to the graphics driver 122 and/or GPU 114 for setting the memory resources for use in playing back the second set of rendering instructions.

In method 300, at action 314, it can be determined whether a fault occurred from playback of the second list of rendering instructions. In an example, fault detecting component 134, e.g., in conjunction with processor 104, memory 106, fault detecting application 126, 156, etc., can determine whether the fault occurred. For example, as described, fault detecting component 134 may receive a notification of the fault from the graphics driver 122 and/or GPU 114 if the fault occurred. In one example, fault detecting application 126 can wait for a period of time, based on deferred execution of the GPU 114, to determine whether the fault occurs.

If the fault did occur in the second list of rendering instructions, at action 316, it can be determined whether the number of instructions in the second list are less than or equal to (e.g., achieve) a target number. In an example, playback component 136, e.g., in conjunction with processor 104, memory 106, fault detecting application 126, 156, etc., can determine whether the number of instructions in the second list achieve a target or threshold number, which may be a low or floor target. For example, the target may be one for a single rendering instruction.

In any case, if the number of instructions in the second list achieve the target, at action 318, the second list of rendering instructions can be indicated as causing the fault. In an example, fault indicating component 140, e.g., in conjunction with processor 104, memory 106, fault detecting application 126, 156, etc., can indicate the second list of rendering instructions as causing the fault. As described, this can include displaying an indication on a user interface provided by the fault detecting application 126 to indicate the one or more rendering instructions in the second list. This can allow a developer to determine the rendering instruction(s) causing the fault, which may enable the developer to quickly identify the rendering instruction(s) and make modifications in an attempt to correct the fault.

If the number of instructions in the second list do not achieve the target, at action 316, method 300 can continue to method 302 to separate the list of rendering instructions (the second list of rendering instructions) again into a first and second list. If occurrence of the fault is not detected at action 314, at action 320, no fault can be indicated. In an example, playback component 136, e.g., in conjunction with processor 104, memory 106, fault detecting application 126, 156, etc., can indicate no fault in the fault detecting application 126. For example, it is possible that the fault may not be reproducible, and in this example, playback component 136 can indicate, via fault detecting application 126, when the fault does not occur after processing both first and second lists of rendering instructions that achieve a target number of instructions.

Figure 4:
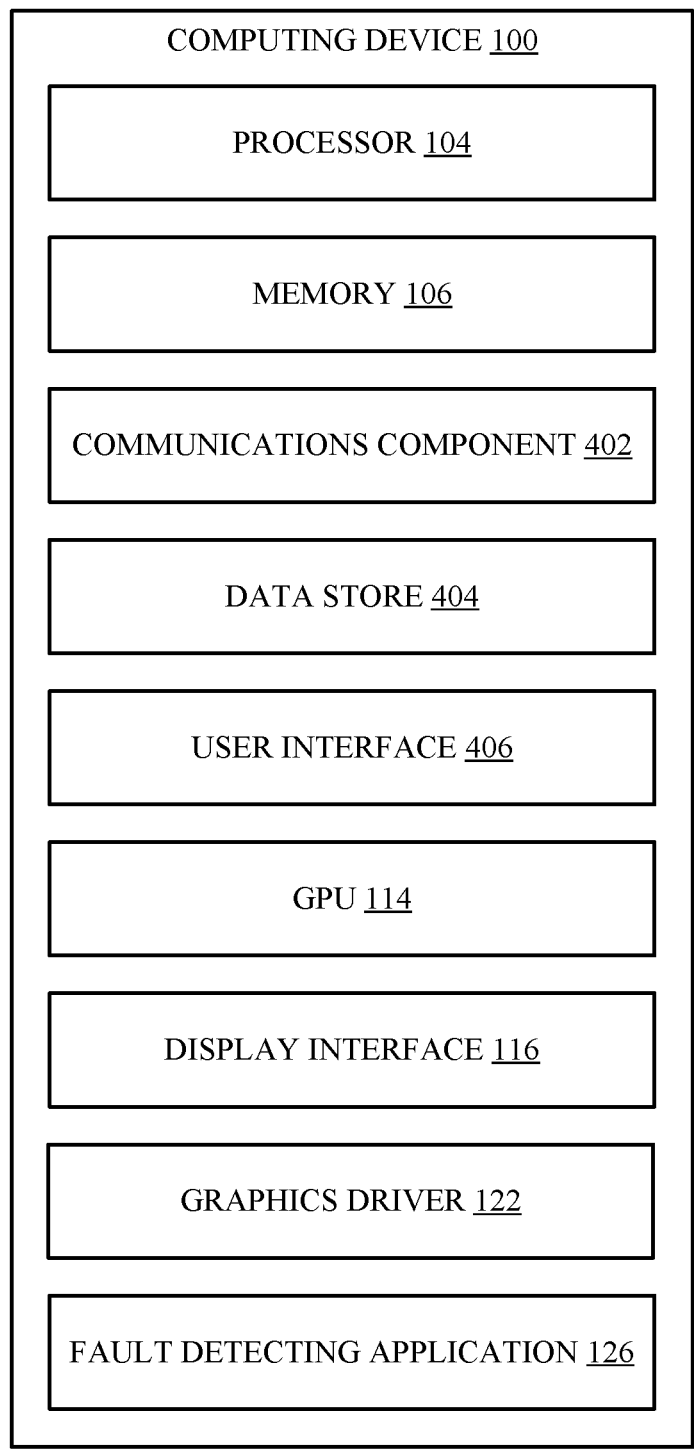
FIG. 4 is a schematic diagram of an example of a computing device for performing functions described herein.

FIG. 4 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, such as graphics driver 122, fault detecting application 126, and/or components thereof, display drivers, etc., as described herein, and/or other components of the computing device 100.

Further, computing device 100 may include a communications component 402 that provides for establishing and maintaining communications with one or more other devices, parties, entities, etc. utilizing hardware, software, and services as described herein. Communications component 402 may carry communications between components on computing device 100, as well as between computing device 100 and external devices, such as devices located across a communications network and/or devices serially or locally connected to computing device 100. For example, communications component 402 may include one or more buses, and may further include transmit chain components and receive chain components associated with a wireless or wired transmitter and receiver, respectively, operable for interfacing with external devices. For example, communications component 402 can carry communications between fault detecting application 126 and a GPU on another device, between distributed components of fault detecting application 126, etc.

Additionally, computing device 100 may include a data store 404, which can be any suitable combination of hardware and/or software, that provides for mass storage of information, databases, and programs employed in connection with examples described herein. For example, data store 404 may be or may include a data repository for applications and/or related parameters not currently being executed by processor 104. In addition, data store 404 may be a data repository for an operating system, application, such as graphics driver 122, fault detecting application 126, and/or components thereof, display driver, etc. executing on the processor 104, and/or one or more other components of the computing device 100.

Computing device 100 may also include a user interface component 406 operable to receive inputs from a user of computing device 100 and further operable to generate outputs for presentation to the user (e.g., via display interface 116 to a display device). User interface component 406 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 406 may include one or more output devices, including but not limited to a display interface 116, a speaker, a haptic feedback mechanism, a printer, any other mechanism capable of presenting an output to a user, or any combination thereof. In an example, user interface component 406 can display or can include interfaces on a display device (e.g., via display interface 116) such as an interface to cause activation of fault detection or rendering instruction capturing, an interface to display a rendering instruction suspected to cause a fault on GPU 114, etc., as described herein.

Computing device 100 can also include a GPU 114, as described herein, for rendering images based on ray tracing instructions received from processor 104. GPU 114 can additionally send signals via a display interface 116 to cause display of the rendered images on a display (not shown). Additionally, computing device 100 may include a graphics driver 122, as described herein, to provide GPU-specific commands to the GPU 114 based on received rendering instructions. Additionally, computing device 100 may include a fault detecting application 126, as described herein, to determine one or more rendering instructions that cause a fault on the GPU 114.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for reporting faults in a graphics processing unit (GPU), comprising:
    capturing, by a processor, a list of rendering instructions for causing the GPU to render graphics;
    detecting, by the processor, occurrence of a fault in executing the list of rendering instructions;
    separating, by the processor and based on detecting occurrence of the fault, the rendering instructions into a first portion of the list of rendering instructions and a second portion of the list of rendering instructions to determine whether the fault is in the first portion or the second portion;
    executing, by the processor and based on detecting occurrence of the fault, the first portion of the list of rendering instructions, in isolation from the second portion of the list of rendering instructions, to identify whether the fault is in the first portion of the list of rendering instructions or the second portion of the list of rendering instructions; and
    indicating the first portion of the list of rendering instructions or the second portion of the list of rendering instructions as causing the fault.

2. The method of claim 1, further comprising:
    detecting, by the processor, the fault in the first portion of the list of rendering instructions; and
    executing, by the processor, a first smaller portion of the first portion of the list of rendering instructions to identify the fault in the smaller first portion or in a second smaller portion of the first portion of the list of rendering instructions,
    wherein indicating the first portion of the list of rendering instructions as causing the fault comprises indicating the first smaller portion or the second smaller portion of the first portion of the list of rendering instructions as causing the fault.

3. The method of claim 1, wherein executing the first portion of the list of rendering instructions comprises playing back the first portion of the list of rendering instructions and capturing the fault at the GPU.

4. The method of claim 3, wherein capturing the list of rendering instructions comprises storing a context related to executing at least a previous portion of the list of rendering instructions, wherein playing back the first portion of the list of rendering instructions is based at least in part on restoring the context prior to playing back the first portion of the list of rendering instructions.

5. The method of claim 4, wherein the context includes a state of memory resources, allocated for the GPU, following executing of the previous portion of the list of rendering instructions.

6. The method of claim 4, wherein executing the first portion of the list of rendering instructions comprises executing multiple smaller portions of the first portion of the list of rendering instructions based at least in part on the context.

7. The method of claim 1, wherein executing the first portion of the list of rendering instructions comprises expanding a bundled set of commands into individual rendering instructions, and executing each of the individual rendering instructions to detect the fault in the bundled set of commands.

8. A computing device for reporting faults in a graphics processing unit (GPU), comprising:
  a memory storing one or more parameters or instructions for executing an operating system and one or more applications including a fault detecting application; and
  at least one processor coupled to the memory, wherein the at least one processor is configured to:
    capture a list of rendering instructions for causing the GPU to render graphics;
    detect occurrence of a fault in executing the list of rendering instructions;
    separate, based on detecting occurrence of the fault, the rendering instructions into a first portion of the list of rendering instructions and a second portion of the list of rendering instructions to determine whether the fault is in the first portion or the second portion;
    execute, based on detecting occurrence of the fault, the first portion of the list of rendering instructions, in isolation from the second portion of the list of rendering instructions, to identify whether the fault is in the first portion of the list of rendering instructions or the second portion of the list of rendering instructions; and
    indicate the first portion of the list of rendering instructions or the second portion of the list of rendering instructions as causing the fault.

9. The computing device of claim 8, wherein the at least one processor is further configured to:
  detect the fault in the first portion of the list of rendering instructions; and
  execute a first smaller portion of the first portion of the list of rendering instructions to identify the fault in the first smaller portion or in a second smaller portion of the first portion of the list of rendering instructions,
  wherein the at least one processor is configured to indicate the first portion of the list of rendering instructions as causing the fault at least in part by indicating the first smaller portion or the second smaller portion of the first portion of the list of rendering instructions as causing the fault.

10. The computing device of claim 8, wherein the at least one processor is configured to execute the first portion of the list of rendering instructions at least in part by playing back the first portion of the list of rendering instructions and capturing the fault at the GPU.

11. The computing device of claim 10, wherein the at least one processor is configured to capture the list of rendering instructions at least in part by storing a context related to executing at least a previous portion of the list of rendering instructions, wherein the at least one processor is configured to playback the first portion of the list of rendering instructions based at least in part on restoring the context prior to playing back the first portion of the list of rendering instructions.

12. The computing device of claim 11, wherein the context includes a state of memory resources, allocated for the GPU, following executing of the previous portion of the list of rendering instructions.

13. The computing device of claim 11, wherein the at least one processor is configured to execute the first portion of the list of rendering instructions at least in part by executing multiple smaller portions of the portion of the list of rendering instructions based at least in part on the context.

14. The computing device of claim 8, wherein the at least one processor is configured to execute the first portion of the list of rendering instructions at least in part by expanding a bundled set of commands into individual rendering instructions, and executing each of the individual rendering instructions to detect the fault in the bundled set of commands.

15. A non-transitory computer-readable medium, comprising code executable by one or more processors for reporting faults in a graphics processing unit (GPU), the code comprising code for:
  capturing, by a processor, a list of rendering instructions for causing the GPU to render graphics;
  detecting, by the processor, occurrence of a fault in executing the list of rendering instructions;
  separating, by the processor and based on detecting occurrence of the fault, the rendering instructions into a first portion of the list of rendering instructions and a second portion of the list of rendering instructions to determine whether the fault is in the first portion or the second portion;
  executing, by the processor and based on detecting occurrence of the fault, the first portion of the list of rendering instructions, in isolation from the second portion of the list of rendering instructions, to identify whether the fault is in the first portion of the list of rendering instructions or the second portion of the list of rendering instructions; and
  indicating the first portion of the list of rendering instructions or the second portion of the list of rendering instructions as causing the fault.

16. The non-transitory computer-readable medium of claim 15, further comprising code for:
  detecting, by the processor, the fault in the first portion of the list of rendering instructions; and
  executing, by the processor, a first smaller portion of the portion of the list of rendering instructions to identify the fault in the first smaller portion or in a second smaller portion of the first portion of the list of rendering instructions,
  wherein indicating the first portion of the list of rendering instructions as causing the fault comprises indicating the first smaller portion or the second smaller portion of the first portion of the list of rendering instructions as causing the fault.

17. The non-transitory computer-readable medium of claim 15, wherein code for executing the first portion of the list of rendering instructions comprises code for playing back the first portion of the list of rendering instructions and capturing the fault at the GPU.

18. The non-transitory computer-readable medium of claim 17, wherein the code for capturing the list of rendering instructions comprises code for storing a context related to executing at least a previous portion of the list of rendering instructions, wherein the code for playing back the first portion of the list of rendering instructions is based at least in part on restoring the context prior to playing back the first portion of the list of rendering instructions.

19. The non-transitory computer-readable medium of claim 18, wherein the context includes a state of memory resources, allocated for the GPU, following executing of the previous portion of the list of rendering instructions.

20. The non-transitory computer-readable medium of claim 15, wherein the code for executing the first portion of the list of rendering instructions comprises code for expanding a bundled set of commands into individual rendering instructions, and executing each of the individual rendering instructions to detect the fault in the bundled set of commands.

* * * * *